United States Patent [19]

Waynant

[11] 3,956,711

[45] May 11, 1976

[54] TRAVELING WAVE TRANSVERSE ELECTRON BEAM FOR LASER PUMPING

[75] Inventor: Ronald W. Waynant, Laurel, Md.

[73] Assignee: The United States of America as represented by the Secretary of the Navy, Washington, D.C.

[22] Filed: Nov. 23, 1973

[21] Appl. No.: 418,344

[52] U.S. Cl. ............................ 331/94.5 PE; 330/4.3; 331/94.5 G; 313/230
[51] Int. Cl.² ............................................... H01S 3/22
[58] Field of Search .................... 331/94.5; 330/4.3; 313/230

[56] References Cited
UNITED STATES PATENTS 3,313,934  4/1967  Beckey ........................ 313/230 X

OTHER PUBLICATIONS

Ahlstrom et al., Applied Physics Letters, Vol. 21, No. 10, 15 Nov.'72, pp. 492–494.
Hodgson, Physical Review Letters, 25(8), 24 Aug. 70, pp. 494–497.
Hunter et al., 1973 IEEE/OSA CLEA Digest of Tech. Papers, May 30–June 1, 1973, pp. 62–63.
Basting et al., Opto–Electronics 4, (1972), pp. 43–44.

Primary Examiner—Robert J. Webster
Attorney, Agent, or Firm—R. S. Sciascia; Arthur L. Branning; Melvin L. Crane

[57] ABSTRACT

An electrode switch arrangement for producing a fast-rise, long-path-length, uniform electron beam for short wavelength laser pumping.

7 Claims, 6 Drawing Figures 3,956,711

TRAVELING WAVE TRANSVERSE ELECTRON BEAM FOR LASER PUMPING

BACKGROUND OF THE INVENTION

This invention relates to short wavelength laser light sources as well as to a laser excitation means for production of a traveling wave transverse electron beam.

Heretofore a traveling wave discharge system has been set forth in an article by John D. Shipman, Jr. in *Applied Physics Letters*, 10, Vol. 1, Jan. 1967, pp 3–4. The teaching of this traveling wave system has been used by others to produce a traveling wave excited gas laser. Such a system has been set forth in U.S. Pat. No. 3,729,689 as well as in several published articles. Such as, "A Fast-Rise-Time Excitation System for Production of Vacuum Ultraviolet Laser Emission", by R. W. Waynant and J. D. Shipman, Jr., *IEEE J. Quantum Electronics*, Vol. QE7, No. 6, June 1971, p 282; and "Vacuum Ultraviolet Laser Emission from CIV", by R. W. Waynant, *Applied Physics Letters*, Vol. 22, No. 8, 15 April 1973, pp 419–420. Additional published articles are listed as references in the latter article. The above references set forth the development of the traveling wave vacuum laser. Principles set forth in the above prior art have been extended to production of wavelengths of light from 1161 to 1240 Angstroms as set forth in "Vacuum-UV Laser Action in $H_2$ Werner Bands : 1161–1240 A", by R. T. Hodson and R. W. Dreyfus, *Physical Review Letters*, Vol. 28, No. 9, pp 536–539, 28 Feb. 1972. The device set forth in the later article has its disadvantages which are over come by the present invention.

SUMMARY OF THE INVENTION

This invention makes use of a capacitor bank or Marx high voltage generator, a flat plate transmission line for voltage pulse shaping, a diode section in which the cathode is formed by a plurality of low inductance razor blade like elements or small pins in combination with a spaced thin titanium anode through which the accelerated electrons emerge. The electrons are accelerated along gas filled container by sequentially firing a plurality of linearly aligned solid dielectric switches.

A Vacuum chamber within which the cathodes are arranged allows electrons to be accelerated to 200–400 kV before passing through the thin foil anode into the high pressure gas filled chamber. In the gas filled chamber, the accelerated electrons excite the gas due to collisions with the gas molecules. Sufficient excitation produces lasing in the short wavelength region.

DESCRIPTION OF THE DEVICE

Figure 1:
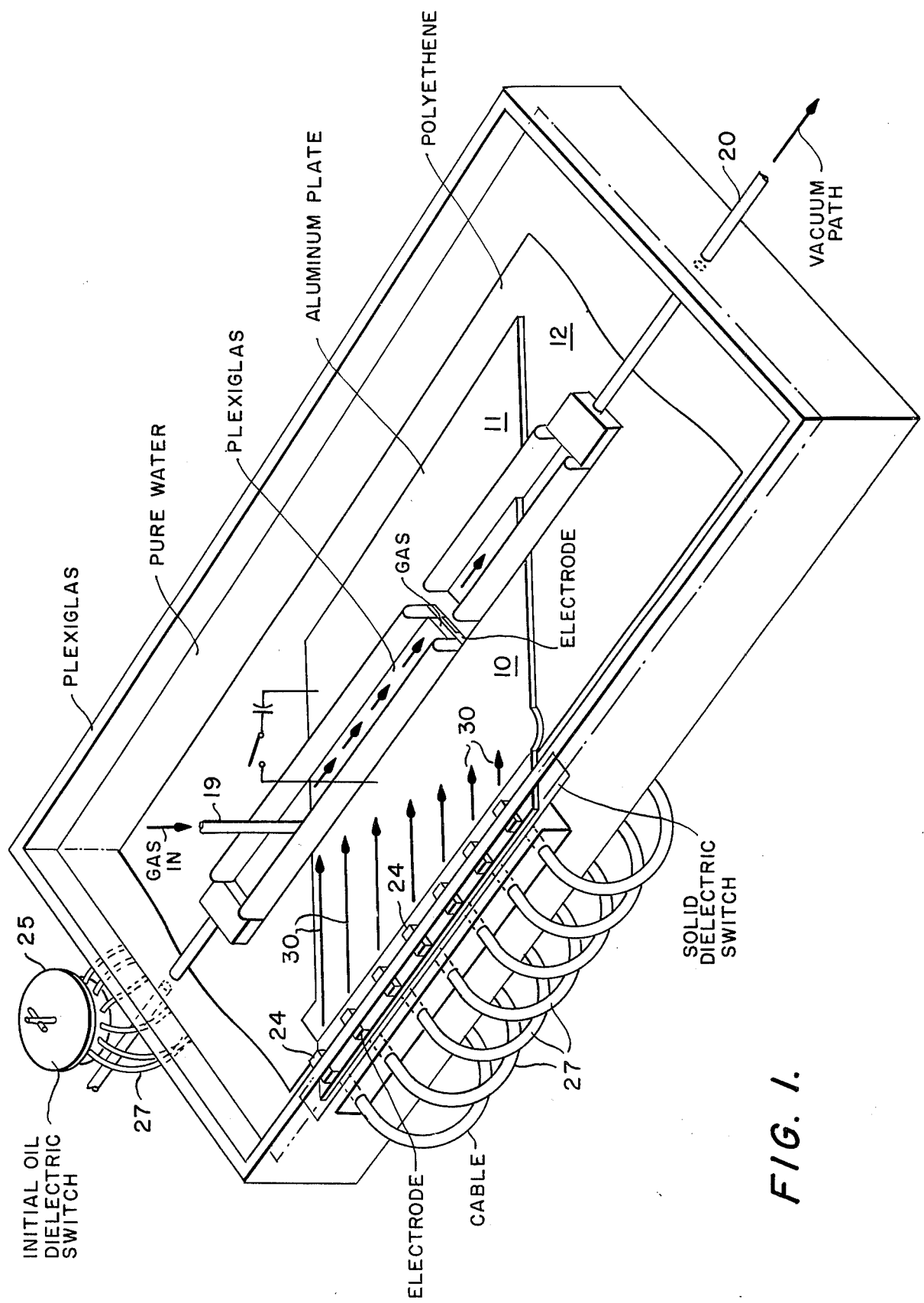
FIG. 1 illustrates a perspective view of a system including the present device.

Now referring to the drawing, there is shown by illustration sandwich-like conductors formed by a low inductance bottom flat plate 9 and upper flat plates 10 and 11 each made of aluminum and separated by a sheet of insulator material 12 such as polyethylene. The top plate is separated to include there-between a diode section. The diode section includes a low inductance cathode 13 formed by an elongated thin metallic plate or by a plurality of side by side thin razor blades. Opposite the razor blades is positioned a thin foil anode 14. The razor blades or metal plate are secured to a low inductance metallic conductor 15 which electrically connects with the end of upper conductor plate 10 and extends upwardly. The plate 10 has a protrusion 16 extending therefrom parallel with the plate 10 to which the cathode is secured. The protrusion 16 has a plate section 17 cut therefrom near the outer end and the plate 17 secures the razor blades in place by use of suitable screws 18 that pass through the plate 17 and the razor blade and threads into the lower portion of the protrusion 16. Therefore the razor blade cathodes are secured tightly in place. The area above and below the protrusion 16 is filled by a block of insulator material 19 such as acrylic or a suitable plastic. The section of the plastic block 19 that protrudes outwardly of the cathode is cut at an angle to form a space or chamber in the vacinity of the cathode. The anode is held in place, spaced from the cathode, by the insulator blocks 19 and a metallic form 20 which is electrically connected to the plate conductor 11. The metallic form 20 is enclosed at the upper surface by a cover 21 to enclose a chamber 22 that meets with the chamber area about the cathode. The cover may be metal, plastic or a material which may serve as a laser window depending on the particular use of the laser excited gases contained within the chamber 22. Also, the end through which laser light emerges is enclosed by a window and the conductive plates 9 and 10, separated by insulator 12, shown cut off in FIG. 2, extend from the anode section as shown in FIG. 1. Lowjitter solid dielectric switches 24 are equally spaced across the edge of the flat plate conductor 10 removed from the anode section such that the switches cause an electrical short between the two flat plates 9 and 10 when electrically fired. The switches are fired sequentially by use of an initiating solid dielectric switch 25 in an oil capacitor. The proper sequence of firing the switches is determined by cutting the connecting cables 27 a different length so that the initiating current is delayed in accordance with the resistance and length of the conductive cable. The switch arrangement and system for sequentially firing the switches are well known and set forth in the publications set forth above. A high voltage storage capacitor is connected across conductive plate 10, and 11 and discharged by the switches. The device may be operated within an evacuated area, in a room at room temperature and/or within a tank filled with pure (de-ionized) water to prevent surface voltage tracking and corona.

One example of making the device, the flat electrically conductive plates are rectangular having a size of 1.6 meters × 1 meter × 1.2 cm with a 1.5 mm thichness sheet of polyethylene separating the plates which is larger in length and width than the flat plates.

Figure 3:
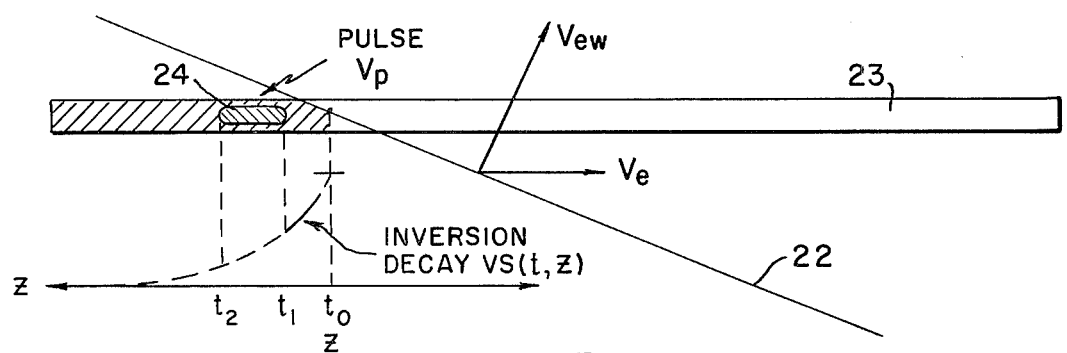
FIG. 3 illustrates an inversion decay Vs $(t,z,)$ curve relative to the pulse velocity, $Vp$, the electromagnetic wave velocity, $Vew$, and the electron velocity, $Ve$.

In operation, the bottom plate of the sandwich is grounded and both sections of the upper plate are resonantly charged to from 50–200 kV. The area between the cathode and anode in the diode is evacuated to about $10^{-5}$ Torr and the gas chamber is then filled with a desired gas at a pressure of about 1–10 atmospheres. The dielectric switch is closed which sequentially closes the shorting switches starting with the first switch closest to the dielectric switch. Upon closing of the first switch, the upper and lower conductive flat plates are shorted together. This produces a reversed voltage wave which travels in both directions toward the electrodes. The intersection of this wave with the electrodes produces a potential across the electrodes which is twice that of the charging voltage which is similar to the well known Blumlein circuit. Since each switch is discharged sequentially, current will be directed to corresponding sections of the cathode in waves which add to produce a nearly plane wave front, as shown in FIG. 3, resulting in generation of electrons by each "section" of the cathode. Electrons are pulled off the cathode in increments along the length thereof by field emission and accelerated to about 200- to about 400kV across the vacuum gap between the razor blade cathodes and the thin foil anode prior to passing through the anode. The electrons pass through the anode (thin foil) into the gas chamber and excite and ionize the gas in the corresponding area opposite the razor blade cathode. As the switches are sequentially closed, current arrives at different sections along the length of the cathode at different times thereby sequentially producing electron emission and thereby exciting and ionizing the gas along the entire length of the device. Since the shorting switches are fired sequentially with a slight delay the reversed voltage produced by each shorting switch arrives at the electrodes at different times thereby producing an electromagnetic wave which is at an angle with the axis of the electrodes as represented by the arrows 30 in FIG. 1. In this way electrons are sequentially emitted along with excitation of the gas from one end of the device to the other. In this manner, the interaction of the electrons with the gas molecules simultaneously produces an inversion. The inversion is swept out by the stimulated emission wave. Therefore light is driven along the channel and emerges from the end of the channel.

During operation, each increment of the cathode is electrically fed by a like increment of transmission line resulting in a uniform transverse e-beam which must propagate only a few centimeters to the gas chamber. This results in a uniformly excited length of gas. Therefore the length of the device may be made as long as desired without any detrimental effects on the system. Further, the voltage reversal produced by sequentially firing the solid dielectric switches enables one to vary the longitudinal velocity of the e-beam excitation and synchronizing it with a radiation pulse as it travels the length of the system. Also, the use of an electron beam rather than an electron discharge has the advantage of controllable electron energy capable of efficient excitation and ionization of the gas in the gas chamber.

FIG. 3 illustrates an inversion decay, $V_e(t,z)$ curve relative to the pulse velocity, $V_p$, the electromagnetic wave velocity, $V_{ew}$, and the excitation velocity, $V_e$. As shown, the electromagnetic line 32 is shown at an angle relative to the plate 33 along which the pulse 34 travels. Since the amplified pulse travels with group velocity which is less than the speed of light and since gain has a short lifetime the excitation velocity, $V_e$, must be adjusted to match the pulse velocity, $V_p$. This adjustment has been set forth in the prior literature in an article "Laser Emission in the Vacuum Ultraviolet from Molecular Hydrogen", by Waynant et al, *Proceedings of the IEEE*, Vol. 59, No. 4, Apr. 1971, pp 679–684 (p 682). As shown by the sketch, FIG. 3, the pulse velocity should travel in the area shown between $t_o$ and $t$, for best results.

Figure 4:
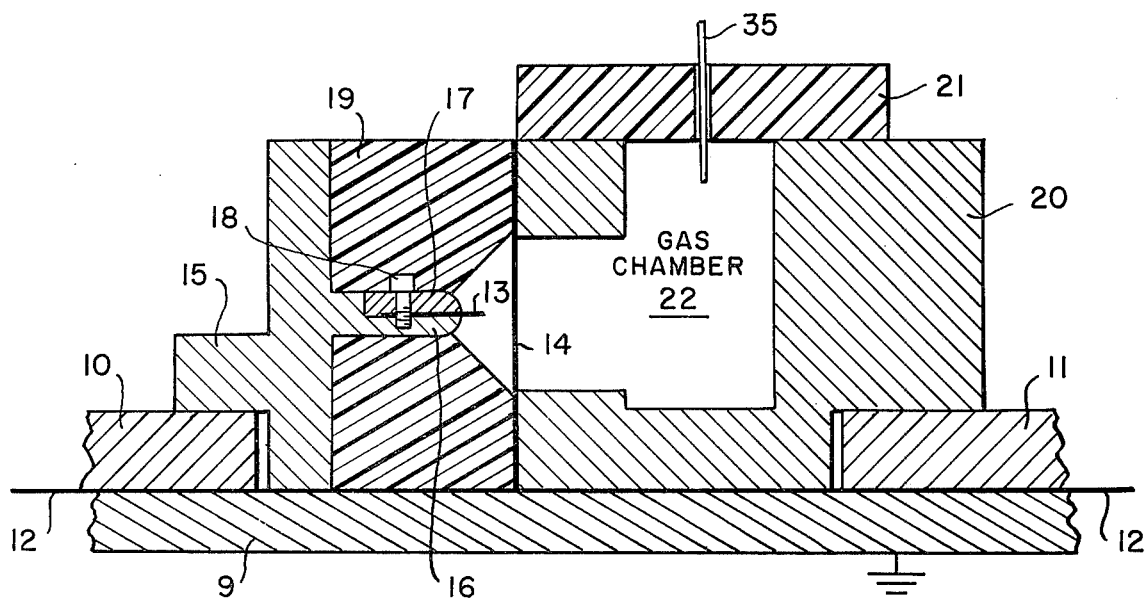
FIG. 4 illustrates a modification of the device shown in FIG. 2 which includes electrodes in the gas chamber.

FIG. 4 illustrates a modification which includes a plurality of auxiliary electrodes 35 aligned along the length of the chamber and extending into the chamber through the upper plate. These electrodes are connected with a conductive plate and a suitable capacitor and are used to preionize a gas within the chamber prior to discharging the main load across the plate electrodes which produces the electrons. Such a system improves the operation in production of the laser light.

Figure 2:
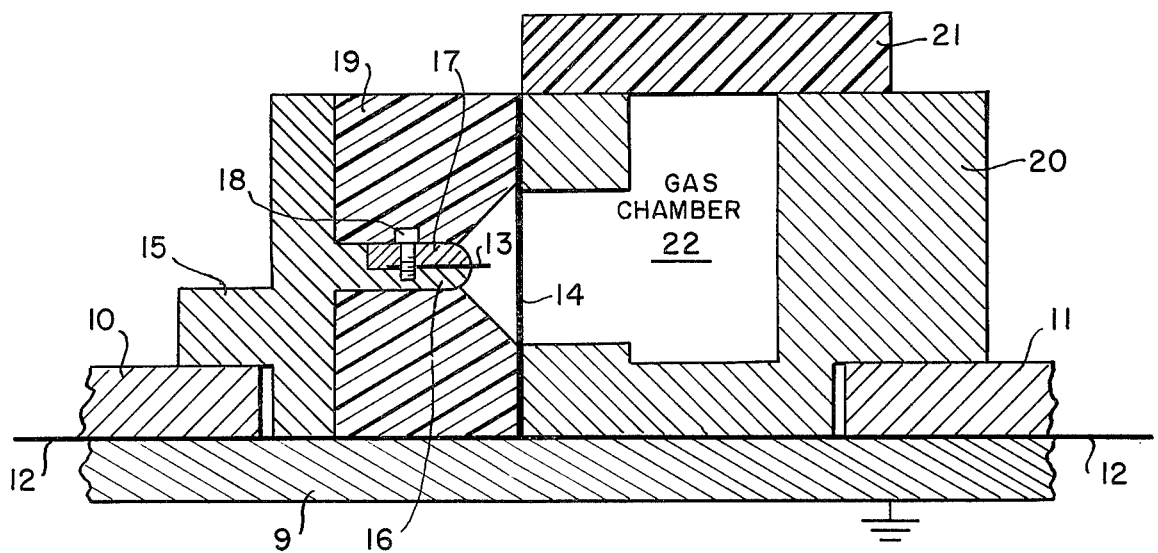
FIG. 2 illustrates a partial cross sectional view illustrating the relative parts of the laser system.
Figure 5:
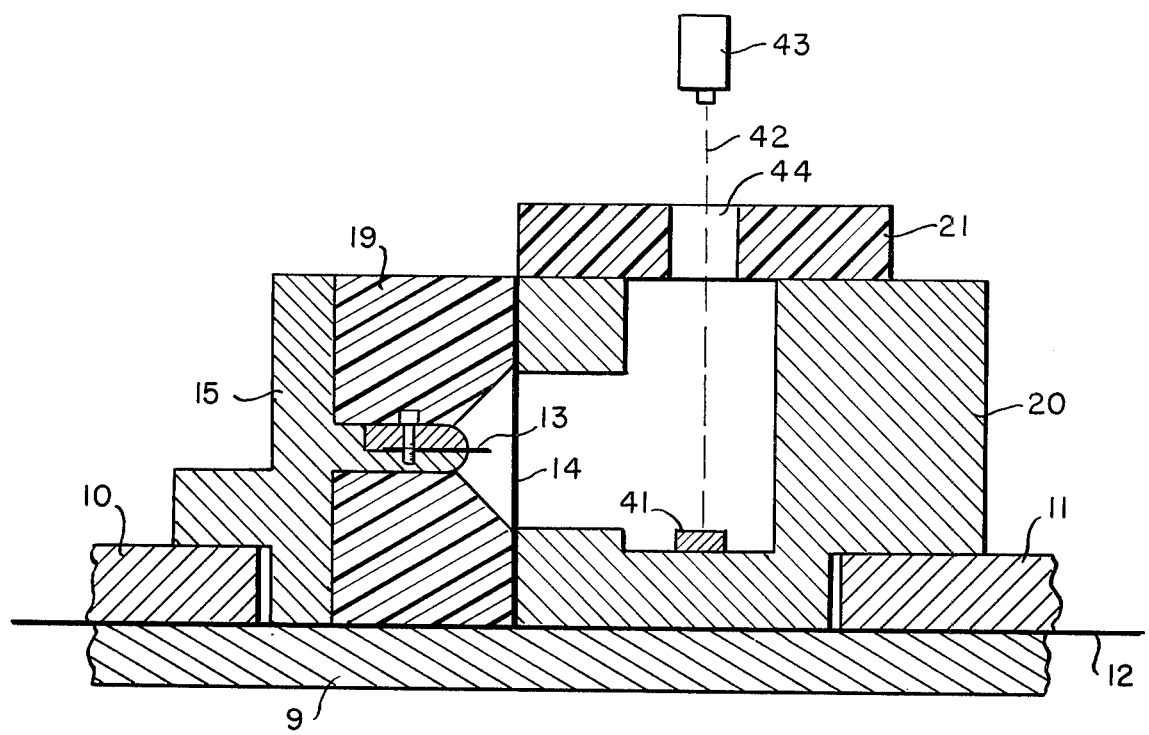
FIG. 5 illustrates a modification which includes a target material in the gas chamber with a laser excitation means.

FIG. 5 is a modification of the device shown by illustration in FIG. 2. This modification includes a target material 41 within the chamber upon which a laser light 42 produced by laser 43 is directed through the window or through a lens 44 within the window and focused onto the target material. The laser light vaporizes the target material which is then excited with the electron beam produced as set forth above in reference to the device, shown in FIGS. 1 and 2. With proper synchronism between vaporization of the target material by the focused laser beam and discharge of the electrons, inversions in highly ionized species may be produced resulting in x-ray laser emission.

Figure 6:
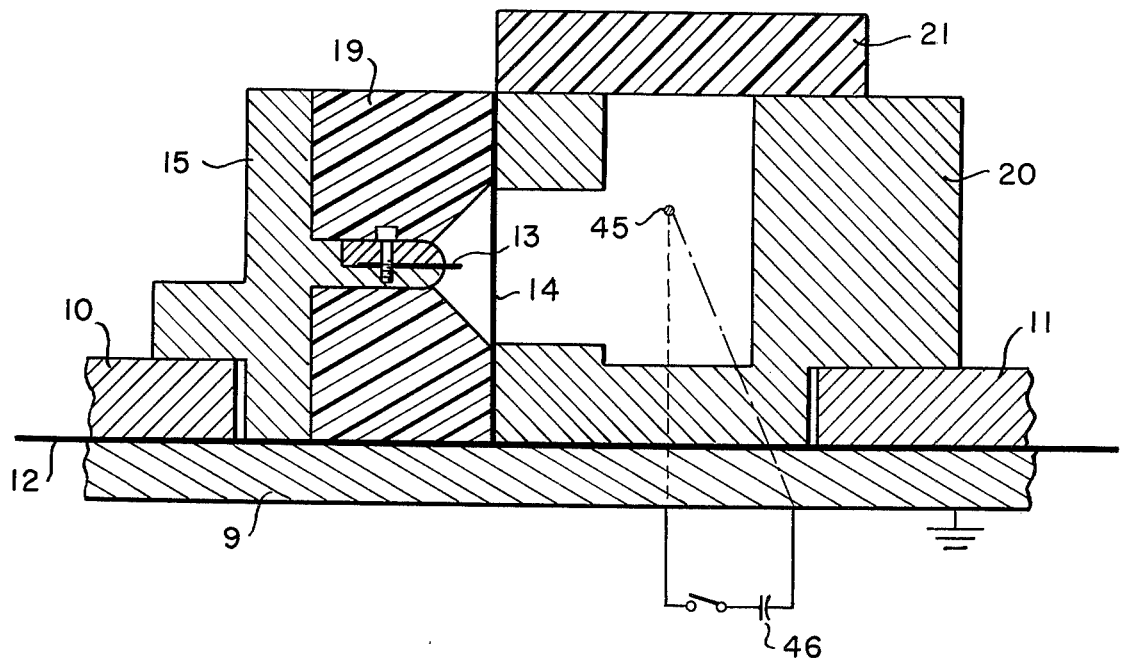
FIG. 6 is a further modification which includes exploding wire extending along the length of the gas chamber

FIG. 6 illustrates a modification including an exploding wire electrode 45 extending along the length of the chamber adjacent to the anode. A high intensity capacitor source 46 is secured to the wire electrode to explode the wire thereby producing an exploding wire plasma in the chamber. Explosion of the wire is synchronized with production of the exciting electrons of the device.

The laser systems set forth above operate without any mirrors such as used in the usual laser cavity. Therefore high powers may be obtained since there are no mirror design restrictions.

Obviously many modification and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for producing a fast-rise, long-path-length, uniform electron beam for short wavelength laser pumping; which comprises, first and second flat plate electrical transmission lines, separated by a thin insulator, said first transmission line separated into two separate sections with oppositely disposed parallel faces, a diode section, said diode section electrically secured between said two sections of said first transmission line, said diode section including an elongated linear cathode including a plurality of side-by-side linearly aligned thin metallic elements projecting toward an elongated thin foil anode, an elongated thin foil anode spaced from said cathode and normal thereto and, an elongated gas chamber adjacent said anode and separated from said cathode in parallism therewith by said anode, and means for sequentially applying a high voltage onto said diode section for generating high energy electrons for passing said high energy electrons through said anode to create a population inversion in a gas in said gas chamber.

2. A device as claimed in claim 1, in which, said metallic elements projecting from said cathode are razor blades.

3. A device as claimed in claim 1, in which, said metallic elements projecting from said cathode toward said anode are small metallic pins.

4. A device as claimed in claim 1, which includes, a plurality of auxiliary electrodes extending into said chamber for maintaining an optimum discharge in the gas in said chamber.

5. A device, as claimed in claim 1, which includes, a target material in said chamber, and a laser means for vaporizing ssid target material.

6. A device as claimed in claim 1, which includes, an auxilliary wire electrode extending the length of said chamber, and means for exploding said wire to produce an exploded wire plasma within said chamber prior to production of high energy electrons excitation by said device.

7. A device as claimed in claim 2, in which, the spacing between said cathode and said anode is evacuated; and said gas chamber includes a gas selected from a group consisting of $Xe_2$, $Kr_2$, $Ar_2$, $Ne_2$, $He_2$, $H_2$.

* * * * *